United States Patent [19]

Schram

[11] Patent Number: 4,998,553
[45] Date of Patent: Mar. 12, 1991

[54] CONTROLLING PARTICULATE MATERIAL

[75] Inventor: Cornelius J. Schram, Pavenham, England

[73] Assignee: National Research Development Corporation, London, England

[21] Appl. No.: 461,525

[22] Filed: Jan. 5, 1990

[30] Foreign Application Priority Data

Jan. 6, 1989 [GB] United Kingdom ................. 8900274

[51] Int. Cl.$^5$ .............................................. F15C 1/04
[52] U.S. Cl. ....................................... 137/13; 137/828
[58] Field of Search ................................... 137/13, 828

[56] References Cited

U.S. PATENT DOCUMENTS

| 2,949,166 | 8/1960 | Coleman et al. | 55/277 |
|---|---|---|---|
| 3,398,758 | 8/1968 | Unfried | 137/828 |
| 3,500,951 | 3/1970 | Beeken | 137/828 |
| 3,500,952 | 3/1970 | Beeken | 137/828 |
| 3,529,615 | 9/1970 | Kishel | 137/828 |
| 3,604,441 | 9/1971 | Rockwell, Jr. | 137/828 |
| 3,730,202 | 5/1973 | Wolf | 137/13 |
| 3,785,405 | 1/1974 | Quinn | 137/13 |

FOREIGN PATENT DOCUMENTS

| 0147032 | 10/1984 | European Pat. Off. |
| 8707178 | 12/1987 | Int'l Pat. Institute |
| 8903243 | 4/1989 | Int'l Pat. Institute |
| 2098498 | 10/1981 | United Kingdom |
| 2211106A | 10/1988 | United Kingdom |

OTHER PUBLICATIONS

H. W. Curtis and E. J. Stephans, "Ultrasonic Continuous Flow Plasmapheresis Separator", IBM Technical Disclosure Bulletin, vol. 25, No. 1, Jun., 1982.

Primary Examiner—A. Michael Chambers
Attorney, Agent, or Firm—Cushman, Darby & Cushman

[57] ABSTRACT

The movement of particles in a liquid flowing in a duct is controlled by an ultrasonic standing wave having nodal fronts at a small angle to one pair of side walls of the duct. As the liquid flows along the duct, particles responsive to the acoustic energy are held on the oblique nodal fronts and are carried along these by the flow so that they also move towards one side wall. Particles in the vicinity of that one side wall are swept from the nodal fronts by the liquid drag forces. At the duct exit the particles will therefore tend to be concentrated in that portion of the liquid flow that passes nearer said one wall.

9 Claims, 1 Drawing Sheet

CONTROLLING PARTICULATE MATERIAL

BACKGROUND OF THE INVENTION

This invention relates to the use of ultrasonic wave energy for the manipulation of particulate material in a liquid medium.

It is known that the acoustic forces from an ultrasonic standing wave acting on particles suspended in a liquid can attract individual particles to the nodes or the antinodes of a standing wave. For the purposes of the present invention it is immaterial whether the attraction is to the nodes or to the antinodes and to simplify the following description these zones of attraction will be referred to only as the nodes or the nodal fronts. Since a similar mechanism is operative for such particles as may be attracted to the antinodes, this alternative is accordingly included within the scope of the invention.

It has been proposed that these mechanisms in an ultrasonic standing wave can be employed to manipulate particulate material. For example in our European patent application No. 147032 (84.307496.4) there is described how two axially opposed ultrasonic transducers can establish a standing wave to control the movement of particles in a coaxial column of liquid interposed between the transducers, and how, by displacing the standing wave along its axis, it is possible to move the particles along the column under the influence of the standing wave.

Such a system has a number of limitations, not least being those arising from the effects of attenuation on the ultrasonic energy in its passage through the medium. This limits the effective length of the standing wave in the column before acoustic streaming weakens unduly the attachment of particles to the nodes. An alternative proposal, in our PCT application WO85/01892(PCT/GB84/00368) can avoid that problem but relies on establishing an appropriate degree of non-uniformity of the acoustic energy density in the nodal fronts of a standing wave, which can lead to complexity in the design and operation of such a system.

The present invention seeks to provide an apparatus and method that permits particles in a liquid medium to be controlled in a relatively simple manner and without being unduly limited by acoustic streaming effects.

SUMMARY OF THE INVENTION

According to one aspect of the invention, there is provided an apparatus for controlling the movement of particulate material carried in a liquid, comprising means for generating an ultrasonic standing wave in the liquid with an axis of the standing wave extending through a boundary wall that contains the particle-carrying liquid, said wall extending obliquely to the axis of the standing wave, and means being provided for relative movement between the liquid and the standing wave in the direction of the boundary wall so as to bring particles attracted to the nodal fronts of the standing wave towards said wall.

In one form of apparatus according to the invention, the liquid flows between opposed walls of a channel and ultrasonic energy generating means at least on one side of the channel produce a standing wave with nodal fronts that intersect said opposed walls, preferably at an angle substantially less than 45°, particles held on the nodal fronts being carried to one or other of said walls depending on the direction of liquid flow through the channel.

With the standing wave operating in a liquid flow through a channel to influence particles in that flow, the channel may be provided with alternative outlets for streams of the flow running nearer to and further from the selected boundary wall, whereby to obtain separate streams respectively enriched or depleted in said particles.

According to another aspect of the invention, there is provided a method for controlling the movement of particulate material in a liquid in which an ultrasonic standing wave is established in a flow of the particle-carrying liquid with its nodal fronts extending obliquely to the direction of flow of the liquid so as to bring particles on the nodal fronts towards a boundary along which the flow runs.

By way of example, the invention will be described in more detail with reference to the accompanying schematic drawings.

DESCRIPTION OF THE PREFERRED EMBODIMENTS

Figure 1:
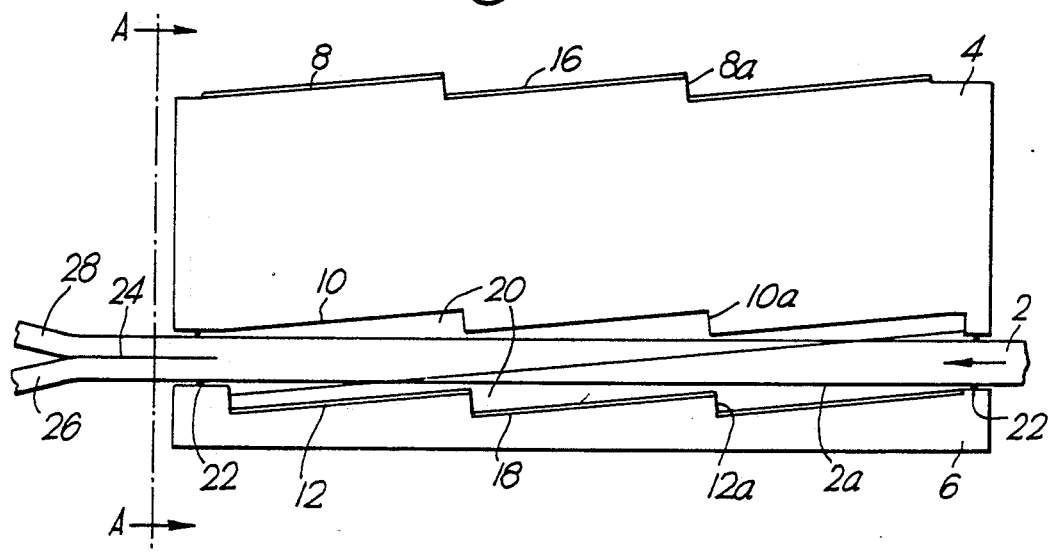
FIG. 1 illustrates one form of apparatus according to the invention.

A rectangular cross-section duct 2 is seen in side view in FIG. 1 of the drawings, lying between an upper acoustic coupling block 4 and a lower reflecting block 6. The top and bottom surfaces of the coupling block form a series of staggered faces 8,10 inclined at an angle of about 5° to the axial direction of the duct, with steps 8a, 10a running between the faces at 90° to the faces. The faces 8,10 of both surfaces are parallel to each other and are longitudinally staggered so that the steps 8a, 10a between each pair of faces lie in common bounding planes. The surface of the reflector block 6 directed towards the duct 2 is similarly provided with inclined faces 12 and steps 12a, the faces 12 being parallel to the faces 8,10 of the coupling block and the steps 12a being coplanar with the steps 8a, 10a of the coupling block.

Fixed to the faces 8 on the top surface of the coupling block 4 is a series of laminar ultrasonic transducers 16 to output acoustic energy through the coupling block along axes perpendicular to the inclined faces. Reflecting plates 18 are fixed to the inclined faces 12 on the top surface of the reflector block 6 to be disposed parallel to the transducers and each reflecting plate is substantially coincident with the orthogonally projected area of a respective transducer. The incident energy from the transducers 16 onto the plates 18 is thus returned along the same axes. The distance between the emitting and reflecting faces 8,12 in the direction of propagation of the energy is equal to an integral number of half wavelengths of the ultrasonic frequency, so that a standing wave is set up between the faces with nodal planes extending parallel to the planes of the faces, i.e. at a small inclination to the axis of the duct.

The distance between the opposite faces 8,10 of the coupling block is preferably sufficient to contain non-uniformities of the acoustic near field substantially within the block, whereby the acoustic energy transmitted through the space between the opposed faces 10,12 is substantially uniform and in the far field.

As examples of suitable materials, the coupling block 4 and the reflector block 6 may both be made of aluminium, and the reflecting plates 18 may be of tungsten. The duct 2 is of an acoustically transparent material, such as polystyrene. In use it is filled with a carrier liquid and the same or an equivalent liquid fills the voids 20 between the opposed faces of the blocks and their adjacent parallel boundary walls of the duct. Seals 22 are provided at the ends of the blocks 4,6 to contain this liquid. Preferably the liquid in the voids 20 is circulated during operation to maintain a steady temperature and to remove any bubbles that might form.

Liquid enters the duct 2 from the right as seen in FIG. 1, in a streamline flow, carrying particles which it is required to separate o concentrate. Suspended particles influenced by the acoustic energy of the standing wave so as to be held at a nodal plane of the standing wave will move along the plane and thus obliquely to the liquid flow, i.e. towards the bottom boundary wall 2a of the duct with the indicated direction of flow.

The major acoustic gradients can be expected to occur generally axially of the standing wave, i.e. perpendicularly to the faces 8,10,12. Because of the small angle of obliquity of the nodal planes and because a relative uniform far-field pattern is established in the duct, the acoustic forces acting axially along the duct are therefore relatively small, so that when the presence of the bottom wall prevents the particles continuing along the oblique nodal plane, they can be detached from their nodes by the drag forces of the liquid flow to continue their passage through the duct. The existence of the acoustic energy field in the liquid will reduce boundary layer effects, so that the liquid velocity close to the bottom wall is better able to generate the viscous drag forces required to detach the particles from the nodes.

The action of the standing waves is thus to concentrate the particles towards the bottom wall as they flow with the liquid through the duct. At the exit end, a partition 24 runs at a level intermediate the height of the duct so that the flow is separated into a lower stream enriched with particles and an upper stream depleted of particles. Exit passages 26,28 draw off the separate streams.

Refraction losses can be kept extremely small in the illustrated arrangement, because of the parallel disposition of the entry and exit faces 8,10 of the coupling block and of the reflecting faces 12. Such losses will be limited to those that may occur at the interface between the duct walls and the liquid, and those arising from the fact that the ultrasonic emission is not fully collimated. The arrangement also has the advantage that a fully resonant energy system can be established.

The angle of the transducers and reflectors to the axis of the duct can be varied within broad limits. It is preferably not more than 45° and can, with advantage, be substantially less. Reducing the angle between the nodal planes and the duct axis means that a longer duct length is required to move particles down through a given height of duct, which may be a disadvantage in some applications. If the angle is made too great, however, the acoustic path through the liquid becomes longer if all other things remain unchanged, and problems of attenuation may become significant. Moreover, it may be more difficult to separate the particles from the standing wave once they reach the bottom wall and excessive accumulations of particles in the duct could disrupt the streamline flow.

With a normal far field energy distribution, the nodes will be planar or almost so. If the inlet flow is carrying a relatively large concentration of particles influenced by the standing wave, as the population density of particles held at a node increases they may collect in a sheet-like mass. Since the nodal planes are oblique to the liquid flow path through the duct 2, such sheet-like areas of high particle population density could impede significantly the flow of the liquid through the duct.

Figure 2:
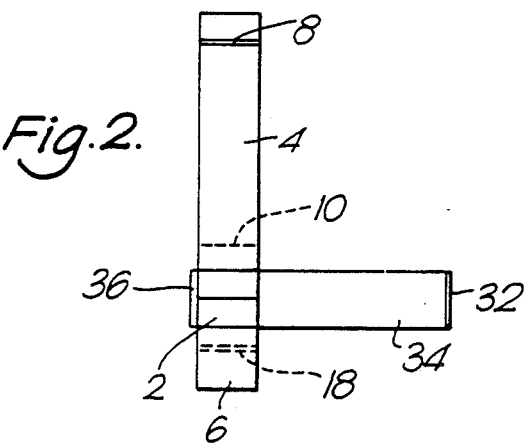
FIG. 2 is a view from the plane AA of a modified form of the apparatus in FIG. 1.

FIG. 2 illustrates a modification of the apparatus of FIG. 1 that can avoid or mitigate this problem. Parts already described with reference to FIG. 1 are given the same reference numbers in FIG. 2. In addition to the standing wave system set up by the transducers 8 and reflectors 12 as already described, means are provided for a second standing wave system with nodes lying transverse, preferably perpendicular, to the nodes of the first system and generally parallel to the axial flow of liquid through the duct. For this system a further transducer 32 outputs through a coupling block 34 on one side of the second pair of side faces of the rectangular cross-section duct and a reflector 36 is secured to the opposite side of that second pair of faces which is at an integral number of half waves from the transducer 32. A single transducer and single reflector will suffice for the second standing wave system, since they are both parallel to the duct, and they may form the boundary walls of opposite sides of the duct. However, they can terminate short of the ends of the duct. Nor is it necessary for the transducers and reflectors of the respective standing wave system to be coterminous axially of the duct.

The two standing wave systems are operated simultaneously so that the acoustic field in the conduit is the resultant of the interaction between the systems, in which the oblique nodal fronts of the first system have acoustic gradients transverse to the direction of liquid flow. With a suitable ratio of field strengths between the two systems, the combined energy pattern can be envisaged as producing a series of string-like nodal concentrations of particles centred at the intersections of the planar nodes of the two systems. Thus, while some particles may still remain attached to the nodes of the first system actuated by the transducers 8, their distribution away from the intersecting regions will be very much diluted by the acoustic gradients developed by the second system. Away from these intersecting regions resistance to axial liquid flow is thus reduced and there is less risk of fluid pressure gradients developing that will cause the flow to sweep particles away from the nodal fronts prematurely.

Whether the single nodal system of FIG. 1 is employed or the two-nodal system of FIG. 2, in both cases the standing wave systems are static. This allows considerable simplification of the control means for the transducers and makes it easier to establish fully resonant conditions so that the acoustic energy is utilized to the maximum. It may be noted that when two standing wave systems are employed as in FIG. 2, there is no need to control precisely the relative frequencies of the two waves. It is merely necessary to ensure that frequencies are employed that give nodal concentrations of the particles being manipulated.

It is not necessary for the apparatus to have the separate and discrete duct 2 shown in the figures. If this is omitted, however, at the flow boundary to which the particles are drawn the staggered faces of the block 6 and reflecting plates 18 are covered by an acoustically transparent covering that presents a planar surface bounding the flow.

Many other modifications are possible within the scope of the invention. For example, instead of having the voids 20 filled with the carrier liquid, it may be more convenient to fill these spaces with a solid material having an acoustic impedance corresponding to that of the carrier liquid, e.g. with water using polyestyrene as for the duct 2. In a unit such as is shown in FIG. 2, the boundary walls providing the second pair of side faces of the duct can be, respectively, the reflector 36 itself and the coupling block 34 of the transducer 32.

It is also possible to produce a standing wave system for use in the invention by interference between the progressive wave outputs of a pair of ultrasonic transducers instead of interacting incident and reflected energy.

It will be apparent without further illustration that in the case of FIG. 1 the lower block 6 and reflecting plates 18 would then be replaced by a second series of transducers and their coupling block corresponding to the transducers 16 and block 4, with the transducers of the upper and lower blocks aligned in the same manner as the transducers 16 and reflecting plates 18 shown. In such a configuration it would also be possible to give the standing wave a movement along its axis, e.g. using the means described in EP 85.304807, to augment the effect of the obliquity of the nodal fronts in bringing particles towards the lower boundary wall.

I claim:

1. A method for controlling the movement of particulate material in a liquid, said method comprising the steps of:
producing a flow of the particulate-carrying liquid,
providing a boundary for said flow extending in the direction of flow,
establishing a standing wave having a series of nodal fronts extending transversely to an axis of the standing wave and being spaced apart from each other in the direction of said axis, said nodal fronts extending obliquely to the direction of flow of the liquid with the angle of obliquity being substantially less than 45°, thereby bringing particles of said particulate material on the nodal fronts towards said boundary along which the flow runs.

2. A method according to claim 1 wherein said nodal fronts are given acoustic gradients transverse to the direction of flow, whereby to provide axially extending regions of lower particle population density in the nodal planes.

3. Apparatus for controlling the movement of particulate material carried in a liquid, said apparatus comprising:
means for generating an ultrasonic standing wave in the liquid, said standing wave having a series of nodal fronts extending transversely to an axis of the standing wave and being spaced from each other in the direction of said axis,
a boundary wall for containing the particulate-carrying liquid, the standing wave passing through said wall, the wall extending obliquely to the axis of the standing wave and an angle of intersection between said nodal fronts and said boundary wall being substantially less than 45°, and
means for allowing relative movement between the liquid and the standing wave in the direction of the boundary wall so as to bring particles of said particulate material attracted to the nodal fronts of the standing wave towards said wall.

4. Apparatus according to claim 3, wherein a channel provides a path for flow of the liquid with a pair of opposed boundary walls defining opposite sides of the channel, and
said ultrasonic generating means being disposed at least on one side of the channel for producing said standing wave with said nodal fronts that intersect said boundary walls, whereby particles held on the nodal fronts are carried to one or the other of said pair of walls depending upon the direction of liquid flow through the channel.

5. Apparatus according to claim 4 wherein the channel has alternative outlets for respective streams of the liquid flow running nearer to and further from the selected boundary wall towards which the particles are brought, whereby to obtain separate streams, one enriched and the other depleted in said particles.

6. Apparatus according to claim 3 comprising further ultrasonic energy generating means for generating a second standing wave for interaction with the first standing wave, the second standing wave having nodal fronts extending transversely to the nodal fronts of the first standing wave and generally parallel to the direction of said relative movement between the liquid and said first standing wave.

7. Apparatus according to claim 6, wherein a channel provides a path for flow of the liquid with a pair of opposed boundary walls defining opposite sides of the channel, and
said ultrasonic energy generating means being disposed at least on one side of the channel for producing said standing wave with nodal fronts that intersect said boundary walls, whereby particles held on the nodal fronts are carried to one or other of said pair of walls depending on the direction of liquid flow through the channel, and
said channel having a further pair of sides transverse to said opposed boundary walls and parallel to each other, and
said further generating means being disposed on at least one side of said further pair of sides.

8. Apparatus according to claim 3 comprising an acoustic coupling member having opposite sides nearer to and further from said boundary wall, the further side being provided with a series of faces located obliquely to said boundary wall, and wherein the means for generating the standing wave comprise a plurality of ultrasonic transducers mounted on said faces and disposed in series along the direction of said relative movement, and successive ones of said faces of the coupling member being joined by a step substantially perpendicular to the faces.

9. Apparatus according to claim 8 comprising a series of reflectors for the outputs of said transducers, means being provided on the opposite side of said boundary wall from the transducers for mounting said reflectors parallel to the transducers, each reflector being substantially coincident with an orthogonally projected area of its associated transducer.

* * * * *